Patented Mar. 12, 1940

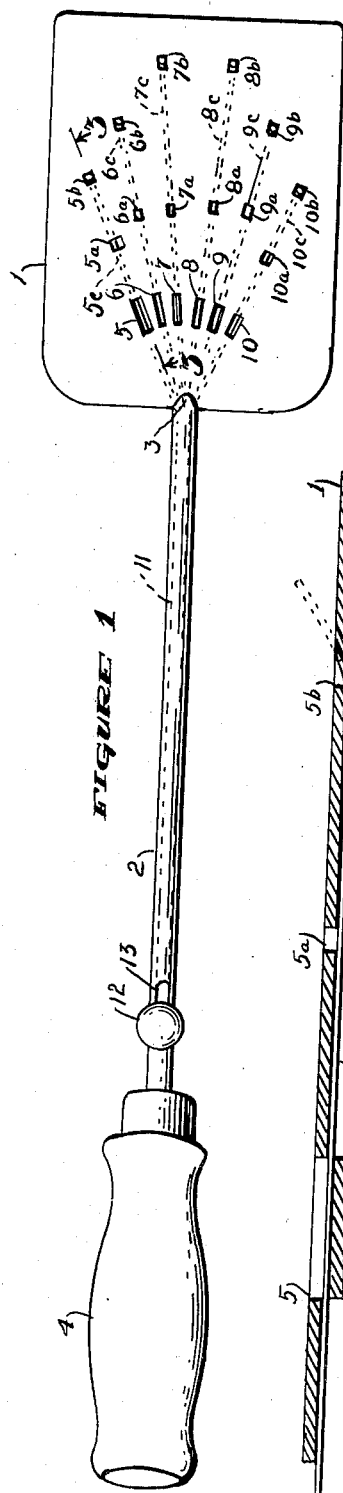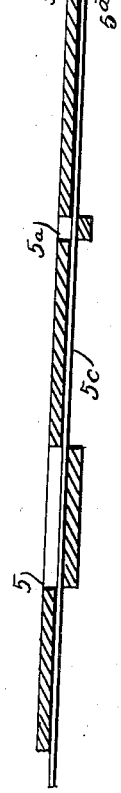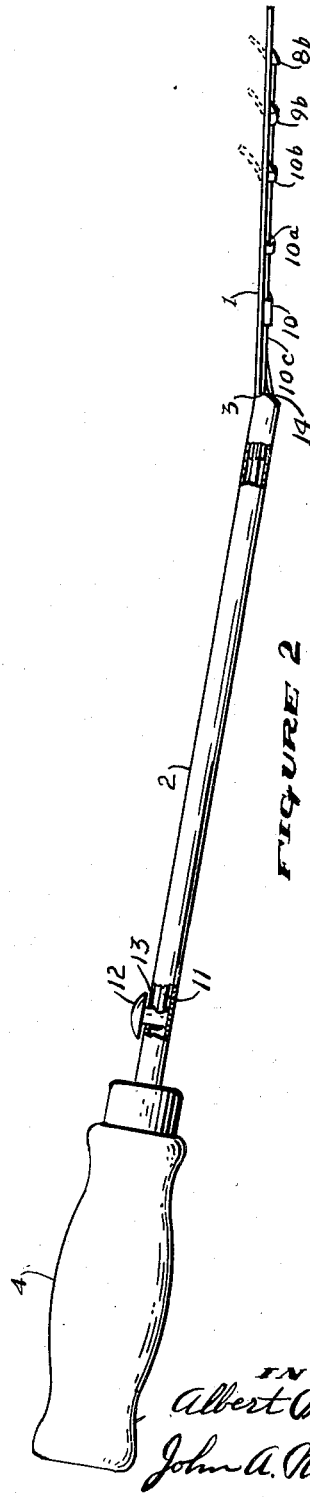

2,193,341

UNITED STATES PATENT OFFICE 2,193,341

COOKING UTENSIL

Albert Mehringer, near Salinas, Calif.

Application June 13, 1939, Serial No. 278,831

4 Claims. (Cl. 294—7)

The present invention relates particularly to a device for the turning of pancakes, frying eggs, and the like, while being cooked.

In certain types of cooking, in which the frying of eggs will hereinafter be referred to as a typical example, the turning of the cooking food is accomplished with considerable difficulty because of its tendency to slide off of the turning implement during the turning operation.

In the frying of eggs, for example, it is common practice to fry the egg on one side, then insert a smooth, flat plate provided with a handle under it, lift it clear of the pan, and then invert it, permitting it to drop freely into the pan again. In performing this process it is easy for the egg to slide off of the turner, with the result that it is more or less badly mutilated, and sometimes it is badly broken and rendered unappetizing.

It is, therefore, one object of the present invention to provide a device of the character indicated that is so formed and constructed that even delicate foods may be picked up and inverted without danger of injury thereto.

It is another object of the invention to provide a device of the character indicated that will support the food in such a manner that it can be turned in a greased pan in such a manner that danger of splattering the hot grease in the pan is entirely eliminated.

It is also an object of the invention to provide a device of the character indicated that will be economical to manufacture, simple in form and construction, strong, durable, and highly efficient in its practical application.

In the drawing:

Figure 1 is a top plan view of a turner embodying my invention.

Figure 2 is a side elevation of the same.

Figure 3 is an enlarged section on line 3—3 of Figure 1.

Referring now more particularly to the drawing, I show at 1 a flat metal plate having a tubular member 2 mounted on the center of one end thereof as at 3, the tubular member being provided with a handle 4 on its outer end.

Formed in the face of the plate 1 are a number of indentations as 5, 5a, 5b, these indentations being disposed to radiate fan-like from the point 3 as shown, and may be as numerous, and spaced, as desired.

Since the several groups of indentations are formed in the same manner and for the same purpose, group 5 will be described in detail, but the description will apply equally as well to the other groups.

In group 5 the indentations are disposed in a straight row, the first two indentations 5 and 5a being formed by sinking a die in the metal in such a manner as to form an open ended groove through which a wire as 5c may be passed. The indentation 5b is open at one end only as 5d and is inclined upwardly and forwardly as shown.

Slidably mounted in the tubular member 2 is a rod 11 fitted with an operating pin 12 passing through a slot 13 in member 2 adjacent the handle 4.

To the forward end of the rod 11 are attached the several wires 5c, 6c, 7c, 8c, 9c, 10c, which pass through the open forward end 14 of member 2, the several wires being of such a length that when the rod 11 is in a retracted position their forward ends will be disposed below the surface of the plate 1 and seated in their respective indentations.

It may now be clearly understood that with the several parts constructed, arranged and disposed as above described the turner may be inserted under a frying egg quickly and easily in the usual manner. But before lifting the egg to turn the same the pin 12 is pushed forwardly, thereby causing all of the wires to be advanced through their slots. In so advancing the wires, which are resilient, their forward ends are projected upwardly as indicated in dotted lines, causing them to penetrate the cooked bottom of the egg.

If the egg is now lifted by the plate 1 it is securely held against slipping, and can be inverted and redeposited in the pan without mutilation and without splattering the grease therein. By reversing the position of the pin 12 the wires may be again withdrawn to an inoperative position.

Although but one specific embodiment of the invention has been herein illustrated and described, it will be understood that various alterations in the details of construction and mode of assembly may be made without departing from the scope of the invention as indicated in the appended claims.

I claim:

1. A turner of the character described comprising, a plate having orifices formed therein, resilient members slidably mounted on the back of the plate with their free ends projectable through said orifices, a handle mounted on the plate, and means slidably associated with the handle operative to project the resilient members through the orifices.

2. A turner of the character described comprising, a plate having orifices formed therein and radially disposed relative to one end thereof, a handle mounted on said end of the plate, resilient members slidably mounted on the back of said plate with their free ends projectable through the foremost of said orifices, and means slidably associated with the handle operative to project the resilient members through said orifices.

3. A turner of the character described comprising, a plate having radially disposed guides formed on the back thereof and having orifices formed therein aligned with said guides and spaced beyond the outermost guides, resilient members slidably mounted in the said guides and projectable through said orifices, a handle member mounted on the plate, and means slidably associated with the handle operative to slide the resilient members through said guides and orifices.

4. A turner of the character described comprising, a plate having a tubular handle member mounted on one end thereof, said plate having guides formed on the back thereof to radiate from said handle and having orifices formed therein to align with said guides and spaced beyond the outermost guides, resilient members slidably mounted in said guides and projectable through said orifices at one end, a member slidably mounted in said handle member and connected to said resilient members at their other ends, the handle member having a slot formed therein, a pin slidably inserted in the slot and connected to the slidable member, whereby a sliding movement imparted to the pin will project the resilient members through the orifices.

ALBERT MEHRINGER.